Figure 3:
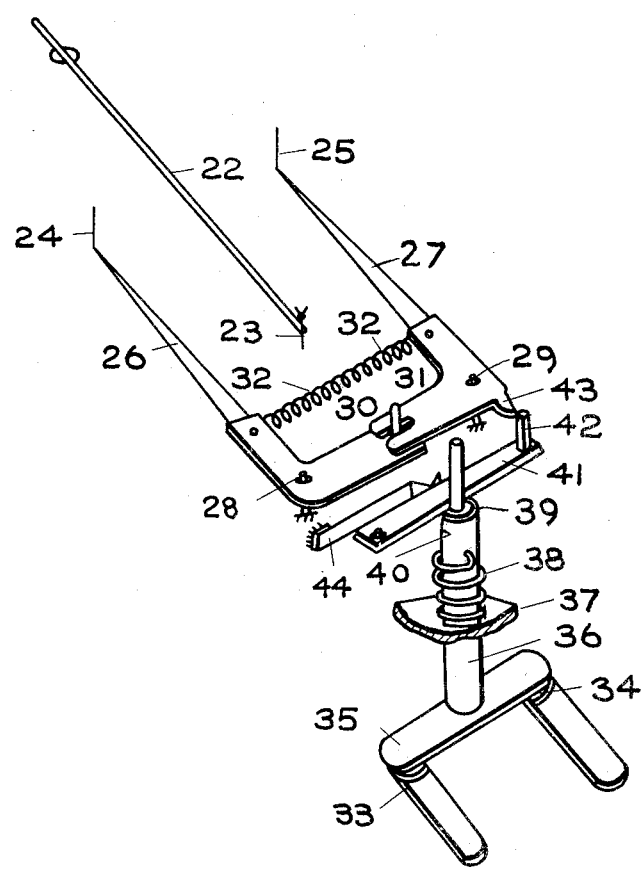

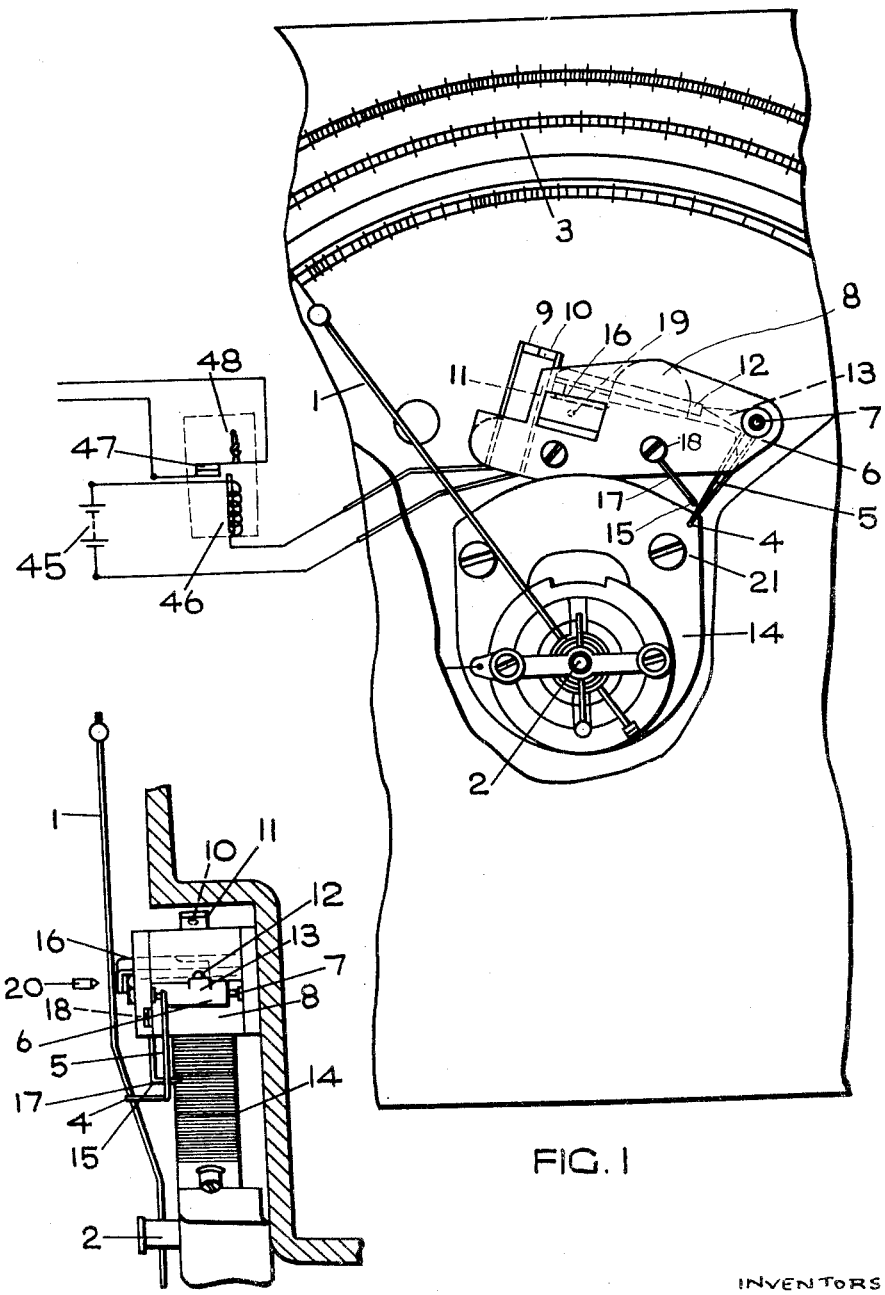

Feb. 27, 1951  J. F. VEEVERS ET AL  2,543,680
ELECTRICAL INDICATING INSTRUMENT
Filed Aug. 13, 1946  2 Sheets-Sheet 2

INVENTORS
JOHN FOSTER VEEVERS
JAMES FRANCIS THOMAS
BY
ATTORNEY

Patented Feb. 27, 1951

2,543,680

UNITED STATES PATENT OFFICE 2,543,680

ELECTRICAL INDICATING INSTRUMENT

John Foster Veevers, Lymm, and James Francis Thomas, Thelwall, England, assignors to The General Electric Company, Limited, London, England Application August 13, 1946, Serial No. 690,308
In England September 1, 1944

Section 1, Public Law 690, August 8, 1946
Patent expires September 1, 1964

7 Claims. (Cl. 171—95)

This invention relates to means for protecting the movements of indicating meters against derangement or injury.

It is common practice in meters to provide a stop or post for engagement by the pointer or other moving indicating element at the end of a swinging movement of maximum extent and in accordance with this invention engagement of the moving indicating element with the post or stop is utilized to actuate a switch controlling an electrical circuit through the meter movement so that, for example in the case of an overload, the overloading circuit is interrupted.

Means are also provided to enable the instrument or meter to be rapidly reset after such protective disconnection has taken place.

The present invention accordingly consists in an electrical indicating meter having a moving pointer or other moving indicating element, wherein protective means are provided comprising a switch, a movable detent adapted, during normal operation of the meter, to occupy a stationary position and to maintain the said switch in the condition for such normal operation and, upon a movement of the indicating element of predetermined extent, to be moved from said stationary position so that the switch operates to interrupt the working current circuit containing the meter, either directly or indirectly.

The invention is illustrated by way of example in the accompanying drawings in which Fig. 1 is a front elevation of a part of an instrument with the front cover removed together with a diagrammatic representation of an auxiliary relay circuit, Fig. 2 is a sectional side elevation of the parts of the construction according to Fig. 1 and relevant to the present invention and Fig. 3 is a diagrammatic representation of an alternative construction.

In the drawings 1 is the usual swinging pointer moving about a pivot at 2 across the scale 3.

In Figs. 1 and 2 the stop stud 4, normally engaged by the pointer 1 of the instrument when moved to its maximum extent, clockwise in the case illustrated, is carried on the end of one arm 5 of a cranked lever 6 pivoted at 7 between lugs at one end of an insulating block 8. At the end of the block 8 away from the cranked lever 6 is mounted a pair of normally closed switch contacts 9, 10 one of which is carried by a spring blade 11 biassed in the direction to part the contacts to open the switch. A rod 12 is mounted for sliding movement in a guide aperture or groove in the block 8, this rod being connected at one end with the switch blade 11 e. g. through the engagement of a neck at the end of the rod, with a keyhole slot in the blade. In the normal position, as shown in Fig. 1, with the switch contacts 9, 10 closed the rod 12 is held against movement by engagement with the free end of the second arm 13 of the cranked pivoted lever 6.

When the pointer 1 makes a movement of maximum extent such as that due to an overload, it strikes against the stud 4 and rocks the lever 6 counterclockwise about its pivot 7 thereby removing the detent formed by arm 13 from engagement with the end of the rod 12. The latter is thus freed to slide under the urge of the spring switch blade 11 and the switch opens. The switch contacts 9 and 10 are connected in series with a battery or other independent current source 45 and a solenoid 46 normally maintaining a primary switch 47 closed against a spring 48. The switch 47 is connected in the working current circuit. When the contacts 9 and 10 are parted as described above, the solenoid circuit is interrupted and the switch 47 is opened by the spring 48.

In certain cases this auxiliary relay circuit including the solenoid 46 and switch 47 may be dispensed with, provided the contacts 9 and 10 are capable of taking the full working current of the instrument.

The stop stud 4 or its supporting arm 5 or both, are formed of magnetic material and a magnetic-return, e. g. magnetic element 14 of the instrument, is utilised to return the cranked lever 6 towards its original position i. e. that shown in Fig. 1 after the circuit breaking operation.

To reset the instrument a sliding wedge or cam bar 16 is provided in a guide slot in the block 8, in a position where the edge thereof may engage the switch blade 11 to close the switch contacts and at the same time move the rod 12 longitudinally and permit arm 13 of the lever 6 to resume its retaining position as shown in Fig. 1.

A stop member may be provided in the form of a pin 15 on the end of a rod 17 adjustable in position on the block 8 by means of a screw 18, to limit the return swing of the lever 6.

The wedge bar is moved against a return spring 19 Fig. 2 by means of a pin 20 connected with a press button (not shown) operable from the front of the instrument.

Control of the direction of the magnetic pull upon post 4 on arm 5 of lever 6 may be achieved by the use of a steel nut at 21 on the magnet of the instrument, the nut being set so that the post 4 is drawn towards a corner of the nut.

In Fig. 3 is illustrated an arrangement providing protection against overloads in either direction.

In this figure 22 is the pointer movable about a pivot 23, and front and back step studs 24, 25 are provided one on each side of the pointer 22. Each stud 24, 25 is fixedly mounted on one arm of one of two similar cranked levers 26 and 27 themselves mounted for movement about pivots 28 and 29 respectively. The other arms of the levers 26 and 27 extend towards one another and overlap at their ends and a pin 30 on the lever 26 extends through a slot 31 in the other lever 27.

A light tension spring 32 extends between the levers 26 and 27 to determine the normal spacing between the levers.

33 and 34 represent the fixed contacts and 35 the movable element of a switch and the levers 26 and 27 carrying the stop studs 24, 25 when in the normal position as shown, serve to maintain the switch closed, whilst when one or other of the levers is rocked by the engagement of the pointer 22 with either stop stud 24 or 25, the switch is permitted to open.

For this purpose the movable contact element 35 is carried at one end of a post 36 arranged for longitudinal movement in a fixed supporting part 37, said post being surrounded by a spring 38 tending to urge it into the switch "open" position i. e. upwards in Fig. 3.

The post 36 is provided with a shoulder 39 which is bevelled at one side as shown at 40 and the bevel is arranged to engage beneath the edge of a pivoted detent lever 41 the free end of which supports a tooth 42 adapted to engage with the extremity of a cam projection 43 on the lever 27 when the latter is in the normal set position as shown, the arrangement being such that the detent lever 41 in this position serves to retain the post 36 in the switch closed position. A light biassing spring such as a leaf spring 44 is provided tending to urge the lever 41 into engagement with the post 36.

The switch 33, 34, 35 may take the full working current of the instrument or it may control the operation of a suitable relay to interrupt the full working current circuit.

During normal functioning of the instrument the parts of the protective arrangement occupy the positions shown in Fig. 3, the tooth 42 on detent lever 41 being engaged with projection 43 on the lever 27 and the switch held closed by the engagement of the edge of lever 41 with the edge of the bevel 40 in register with shoulder 39 on post 36.

Should an overload occur in either direction causing the pointer 22 to engage either stop stud 24 or 25, the lever 27 is rocked either directly, or indirectly by lever 26 through the pin and slot connection 30, 31, and the cam projection 43 disengaged from tooth 42 on detent lever 41. The lever 41 is now free to be rocked about its pivot by virtue of its engagement with the bevelled surface 39 as the spring urged post 36 and the latter moves to the switch open position. It will be understood that the thrust due to spring 38 is capable of overcoming spring 44.

Resetting is effected by a press button or the like (not shown) whereby rod 36 may be thrust in the direction to close the switch, the lever 41 moving back into the position shown, under the pressure of spring 44 to re-engage its edge with the bevel 39 of post 36 and the tooth 42 with projection 43 on lever 27.

We claim:

1. Protective means for an electrical indicating meter of the kind employing a moving pointer and a two-position switch including contacts in the working current circuit through the meter, said switch in one position thereof interrupting the working current circuit for the meter and in the other position thereof restoring the working current circuit for the meter, said switch including an operating element movable between two positions, the first position of which corresponds to the first position of the switch and the other position of which corresponds to the other position of the switch: said protective means comprising a stop for the pointer, means to mount said stop on said meter in the path of travel of the pointer and for movement in the direction of the pointer movement whereby said stop will be impacted by the pointer upon movement of the pointer more than a predetermined extent and thereafter said stop will move with the pointer upon being impacted thereby, means to bias said switch operating element to its first-named position, a blocking member, means to mount said blocking member for movement in a predetermined path, said blocking member in one position in said path lying between the two positions of the switch operating member and abutting said switch operating member when the latter is in its first-named position, thereby preventing said switch operating member from moving to its second-named position, a detent of magnetic material mounted for movement in a predetermined path transverse to the path of movement of said blocking member, said detent in a portion of said path abutting said blocking member and thus preventing movement thereof when the latter is in its said one position, magnetic return means to urge said detent into said portion of said path in which it abuts said blocking member, and means interconnecting said stop and said detent for movement, said stop normally being so positioned that said detent normally is in its mentioned position whereby when said stop is impacted by said pointer and moved the detent will shift clear of the path of the blocking member and the switch operating element will be free to move to its first-named position under the influence of the biasing means.

2. Protective means for an electrical indicating meter of the kind employing a moving pointer and a two-position switch including contacts in the working current circuit through the meter, said switch in one position thereof interrupting the working current circuit for the meter and in the other position thereof restoring the working current circuit for the meter, said switch including an operating element movable between two positions, the first position of which corresponds to the first position of the switch and the other position of which corresponds to the other position of the switch: said protective means comprising a stop for the pointer, means to mount said stop on said meter in the path of travel of the pointer and for movement in the direction of the pointer movement whereby said stop will be impacted by the pointer upon movement of the pointer more than a predetermined extent and thereafter said stop will move with the pointer upon being impacted thereby, means to bias said switch operating element to its first-named position, said biasing means comprising a spring blade on which one of the contacts is mounted, said operating element constituting a portion of said blade, a blocking member constituting a pin, guide means to cause said pin to move in a predetermined path, said blocking member in one position in said path lying between the two positions of the switch operating member and abutting said switch operating member when the latter is in its first-named position, thereby preventing said switch operating member from moving to its second-named position, a detent mounted for movement in a predetermined path transverse to the path of movement of said blocking member, said detent in a portion of said path abutting said blocking member and thus preventing movement thereof when the latter is in its said one position, and means interconnecting said stop and said detent for movement, said stop normally being so positioned that said detent normally is in its mentioned position whereby when said stop is impacted by said pointer and moved the detent will shift clear of the path of the blocking member and the switch operating element will be free to move to its first-named position under the influence of the biasing means.

3. Protective means as set forth in claim 2 wherein the pin is connected to the blade for movement therewith and wherein there is provided a manually operable wedge element and means to guide said wedge element for movement toward and away from a position in which it engages the spring blade and moves the same to its first-named position whereby when the wedge is moved to its said position and the blocking member moved with it the detent can be re-abutted against the pin.

4. In combination with an electrical indicating meter having a moving pointer, a two-position switch including contacts controlling the working current circuit through the meter, said switch in one position thereof interrupting the working current for the meter and in the other position thereof restoring the working current circuit for the meter, said switch including an operating element movable between two positions, the first position of which corresponds to the first position of the switch and the other position of which corresponds to the other position of the switch, said pointer being undeviatingly movable along an unchangeable path of travel from an idle position to a predetermined position of maximum travel, a stop for the pointer, means to mount said stop on said meter in the path of travel of the pointer at the predetermined position of maximum travel and for movement in the direction of the pointer movement whereby said stop will be impacted by the pointer upon movement of the pointer more than a predetermined extent and thereafter said stop will move with the pointer upon being impacted thereby, means to bias said switch operating element to its first-named position, a blocking member, means to mount said blocking member for movement in a predetermined path, said blocking member in one position in said path lying between the two positions of the switch operating member and abutting said switch operating member when the latter is in its first-named position, thereby preventing said switch operating member from moving to its second-named position, a detent mounted for movement in a predetermined path transverse to the path of movement of said blocking member, said detent in a portion of said path abutting said blocking member and thus preventing movement thereof when the latter is in its said one position, and means interconnecting said stop and said detent for movement, said stop normally being so positioned that said detent normally is in its mentioned position whereby when said stop is impacted by said pointer and moved the detent will shift clear of the path of the blocking member and the switch operating element will be free to move to its first named position under the influence of the biasing means.

5. A combination as set forth in claim 4 wherein the switch contacts are in the working current circuit through the meter.

6. A combination as set forth in claim 4 wherein a second switch is provided, said second switch including contacts in the working current circuit for the meter, and a relay circuit controlling said second switch, the two-position switch having its contacts in the relay circuit.

7. A combination as set forth in claim 4 wherein a second stop is provided, said stops being on opposite sides of the pointer, said stops being mounted and functioning in the same manner.

JOHN FOSTER VEEVERS.
JAMES FRANCIS THOMAS.

REFERENCES CITED

The following references are of record in the file of this patent:

UNITED STATES PATENTS

| Number | Name | Date |
| --- | --- | --- |
| 396,940 | Knowles | Jan. 29, 1889 |
| 683,831 | Arcioni | Oct. 1, 1901 |
| 726,479 | Tate | Apr. 28, 1903 |
| 726,777 | Tate | Apr. 28, 1903 |
| 1,673,591 | Reid | June 12, 1928 |
| 1,782,454 | Arnold | Nov. 25, 1930 |
| 2,153,777 | Swart | Apr. 11, 1939 |
| 2,436,444 | Merrick | Feb. 24, 1948 |

FOREIGN PATENTS

| Number | Country | Date |
| --- | --- | --- |
| 464,867 | Great Britain | Apr. 26, 1937 |